(12) United States Patent
A et al.

(10) Patent No.: US 12,147,315 B2
(45) Date of Patent: Nov. 19, 2024

(54) USING DELTA SNAPSHOTS TO FACILITATE INTENT POLICY MODEL ROLLBACK AND DEPLOYMENT

(71) Applicant: Juniper Networks, Inc., Sunnyvale, CA (US)

(72) Inventors: Chandrasekhar A, Bengaluru (IN); Premchandar N, Bangalore (IN); Jayanthi R, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 18/070,954

(22) Filed: Nov. 29, 2022

(65) Prior Publication Data

US 2024/0176709 A1    May 30, 2024

(51) Int. Cl.
*G06F 11/14*    (2006.01)
*G06F 16/11*    (2019.01)
*G06F 16/174*    (2019.01)

(52) U.S. Cl.
CPC ........ *G06F 11/1469* (2013.01); *G06F 16/125* (2019.01); *G06F 16/1756* (2019.01)

(58) Field of Classification Search
CPC . G06F 11/1469; G06F 16/126; G06F 16/1756
See application file for complete search history.

(56) References Cited

U.S. PATENT DOCUMENTS 10,078,555 B1 *  9/2018  Kumar ................. G06F 16/188
11,140,031 B2   10/2021  R et al.
2002/0169740 A1 * 11/2002 Korn .................... G06F 16/1756
2003/0101321 A1   5/2003  Ohran
2006/0059384 A1 *  3/2006 Helliker ............... G06F 11/1466
                                                        714/13
2017/0060449 A1 *  3/2017 Zucca .................... G06F 3/0673
2019/0179918 A1   6/2019  Singh et al.
2020/0387432 A1  12/2020  Kamijoh et al.
2022/0200863 A1   6/2022  Kotalwar
2023/0205639 A1 *  6/2023 Yadav .................. G06F 11/1446
                                                        707/645

FOREIGN PATENT DOCUMENTS

EP          3771150 A1    1/2021

OTHER PUBLICATIONS

Extended European Search Report for Application No. EP23153157.5, mailed on Aug. 16, 2023, 09 pages.

\* cited by examiner

*Primary Examiner* — Mark A Giardino, Jr.
(74) *Attorney, Agent, or Firm* — Harrity & Harrity, LLP

(57) ABSTRACT

A system identifies an intent policy model associated with an initial time. The system updates a data structure to cause the data structure to include one or more portions. Each portion of the data structure is associated with a start time and an end time. Each portion includes: a first delta snapshot that indicates one or more first changes to the intent policy model from the initial time to the start time associated with the portion, and one or more additional delta snapshots that respectively indicate one or more incremental changes to the intent policy model at times from the start time and to the end time associated with the portion of the data structure.

20 Claims, 14 Drawing Sheets

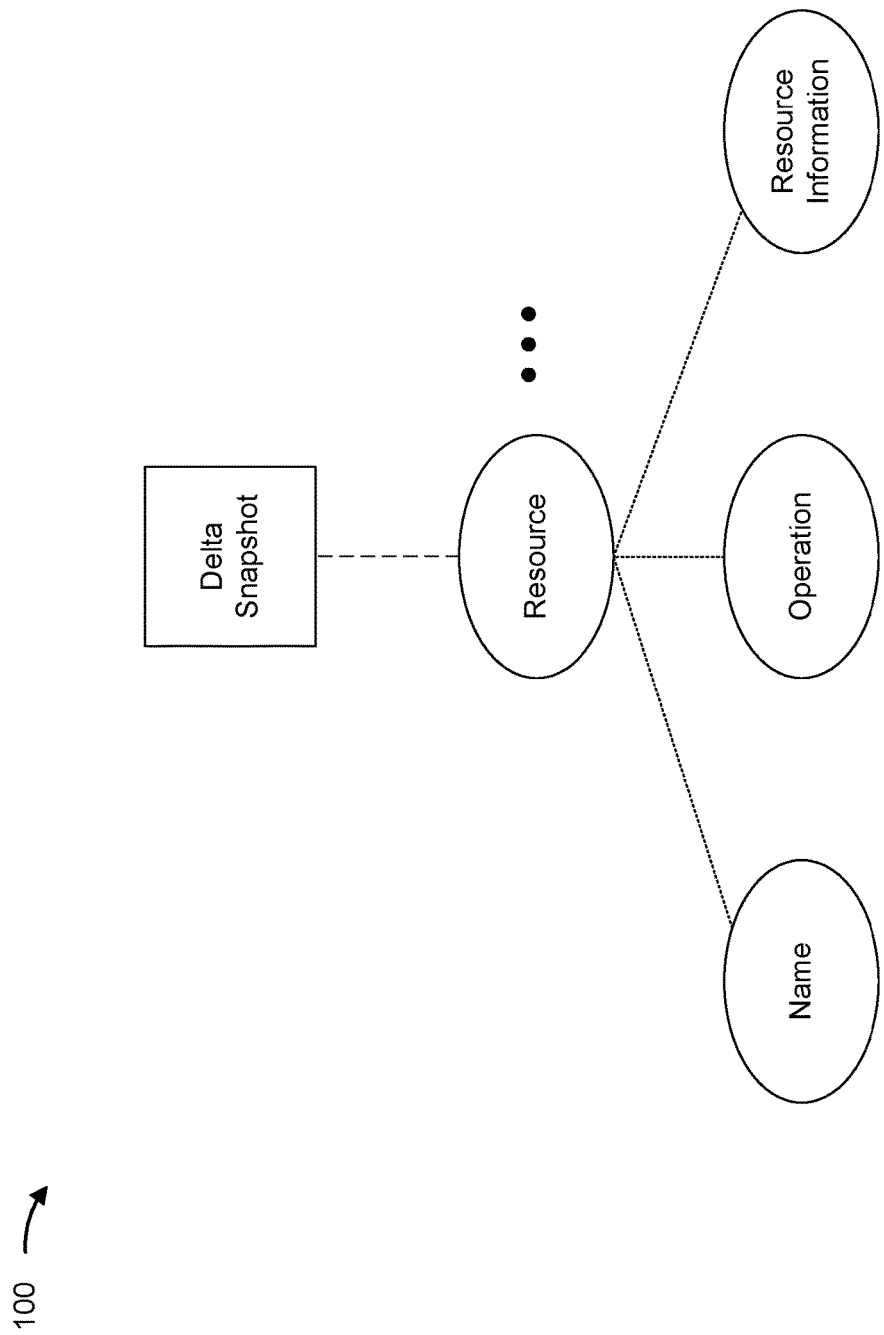

USING DELTA SNAPSHOTS TO FACILITATE INTENT POLICY MODEL ROLLBACK AND DEPLOYMENT

BACKGROUND

Network devices typically include mechanisms, such as management interfaces, for locally or remotely configuring the network devices. By interacting with a management interface, an administrator can perform configuration tasks, such as configuring interface cards of a network device, adjusting parameters for supported network protocols of the network device, specifying physical components within the network device, modifying routing information maintained by the network device, accessing software modules and other resources residing on the network device, and/or other configuration tasks.

A network device can be configured by a network management system according to a declarative network operation model, such as an intent-based networking model. The system allows administrators to describe one or more intended states of the network device, such as an intended network state, execution state, storage state, and/or another state. Intents can be categorized as stateful intents or stateless intents. Stateful intents (also referred to as "business policies") may be resolved based on a current state of the network device. Stateless intents may be resolved regardless of the current state of the network state.

Intents may be represented in an intent data model, which may be modeled using a unified graph. For example, the intent data model may be represented as a connected graph having vertices (e.g., that represent configuration objects) connected with edges (e.g., that represent relationships between configuration objects). In order to configure a network device to perform the intents, translation programs translate high-level configuration information (e.g., that includes instructions according to the intent data model, which may be expressed as the connected graph) to low-level configuration information (e.g., that includes instructions according to a device configuration model) for the network device.

SUMMARY

In some implementations, a method includes generating, by a system, an initial delta snapshot that indicates one or more first changes to an intent policy model from an initial time to a first time; storing, by the system, the initial delta snapshot in a first portion of a data structure; generating, by the system and after storing the initial delta snapshot, a first delta snapshot that indicates one or more second changes to the intent policy model from the first time to a second time; storing, by the system, the first delta snapshot in the first portion of the data structure; generating, by the system and after storing the first delta snapshot, a second delta snapshot that indicates one or more third changes to the intent policy model from the second time to a third time; storing, by the system, the second delta snapshot in the first portion of the data structure; determining, by the system and after storing the second delta snapshot, that additional delta snapshots are not to be stored in the first portion of the data structure; generating, by the system, based on determining that additional delta snapshots are not be stored in the first portion of the data structure, and based on the initial delta snapshot, the first delta snapshot, and the second delta snapshot, an accumulated delta snapshot that indicates the one or more first changes, the one or more second changes, and the one or more third changes to the intent policy model from the initial time to the third time; and storing, by the system, the accumulated delta snapshot in a second portion of the data structure.

In some implementations, a non-transitory computer-readable medium storing a set of instructions includes one or more instructions that, when executed by one or more processors of a system, cause the system to: identify an intent policy model associated with an initial time; and update a data structure to cause the data structure to include one or more portions, wherein each portion of the data structure is associated with a start time and an end time, and each portion includes: a first delta snapshot that indicates one or more first changes to the intent policy model from the initial time to the start time associated with the portion; and one or more additional delta snapshots that respectively indicate one or more incremental changes to the intent policy model at times from the start time and to the end time associated with the portion of the data structure.

In some implementations, a system includes one or more memories; and one or more processors to: update a data structure to cause the data structure to include a plurality of portions, wherein each portion of the data structure includes: a first delta snapshot that indicates one or more first changes to an intent policy model from an initial time to a start time associated with the portion; and one or more additional delta snapshots that respectively indicate one or more incremental changes to the intent policy model at times from the start time and to an end time associated with the portion of the data structure.

BRIEF DESCRIPTION OF THE DRAWINGS

FIGS. 1A-1I are diagrams of one or more example implementations described herein.

DETAILED DESCRIPTION

Figure 1A:
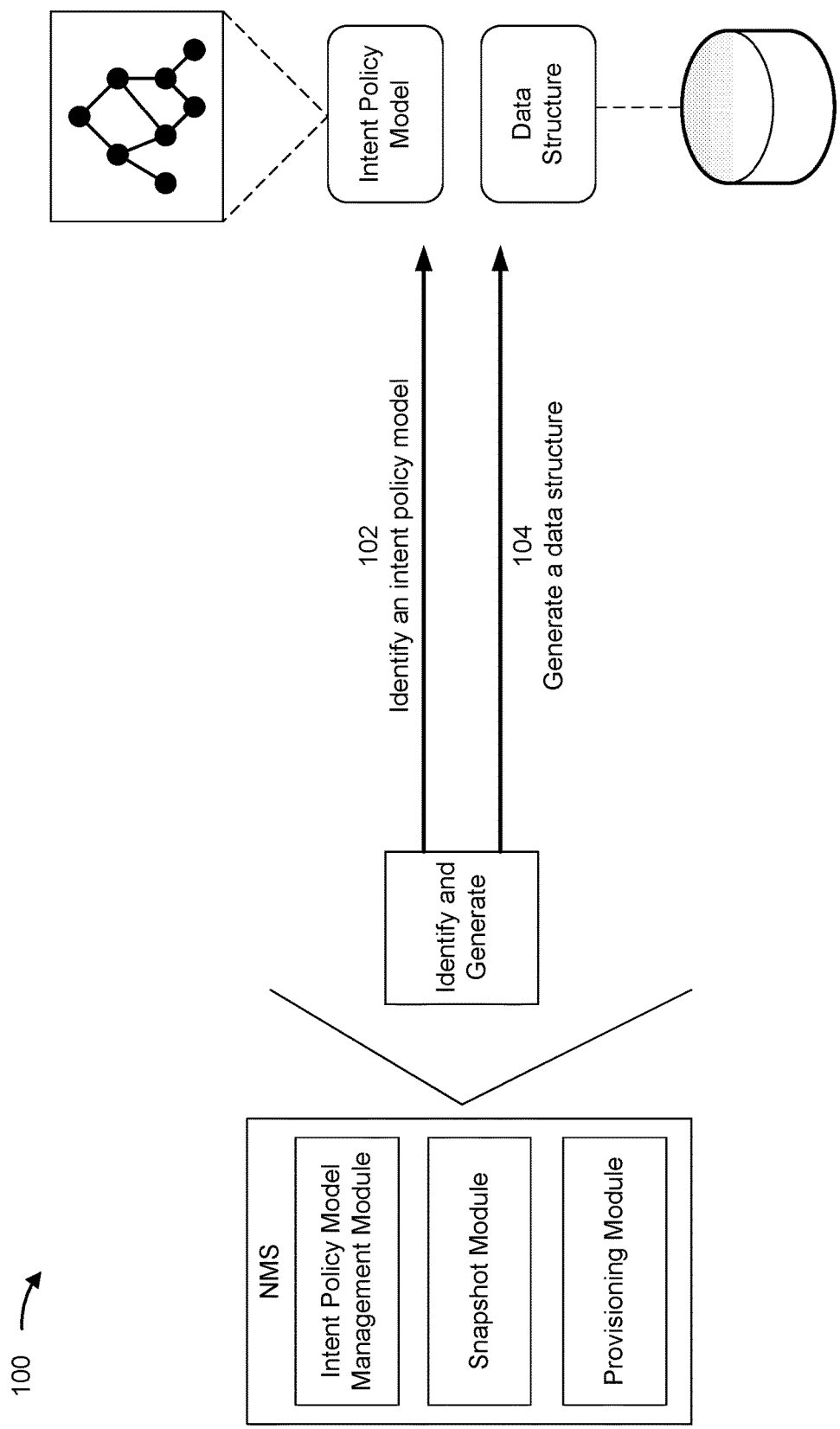

The following detailed description of example implementations refers to the accompanying drawings. The same reference numbers in different drawings may identify the same or similar elements.

A network management system can generate, based on an intent policy model, device-level configuration information and provide the device-level configuration information to a network device to cause the device-level configuration information to be deployed on the network device. In many cases, however, changes are made to the intent policy model after the device-level configuration information is deployed on the network device. The network device may therefore need to be updated with changes to the device-level configuration information that correspond to the changes to the intent policy model. Alternatively, the network device may need to roll back to a prior version of the device-level configuration information that was previously deployed on the network device (e.g., due to performance issues that result from deployment of a current version of the device-level configuration on the network device).

Generating and deploying different device-level configuration information based on either the updated intent policy model or a prior version of the intent policy model utilizes computing resources (e.g., processing resources, memory resources, communication resources, and/or power resources, among other examples) of the network management system and the network device that could otherwise be utilized to perform other tasks. This impacts a performance of the network management system and the network device. In some cases, the network management system can use a "snapshot" approach to track changes to the intent policy model at various times since a time of origination of the intent policy model, such that the network management system can then generate and deploy a device-level configuration information patch that includes just changes to the intent policy model since the time of origination. However, managing and storing all changes to the intent policy model at different points in time requires further use of computing resources (e.g., processing resources, memory resources, communication resources, and/or power resources, among other examples). Further, in many cases, the intent policy model is continually updated, so generating and deploying a device-level configuration information patch that includes changes since the time of origination often results in excessive use of computing resources, such as when the current version of the device-level configuration information deployed on the network device only needs to be updated corresponding to a few recent changes to the intent policy model.

Some implementations described herein provide a network management system (NMS). The NMS identifies an intent policy model and generates a data structure that is configured to store delta snapshots associated with changes to the intent policy model. The data structure may include one or more portions (also referred to as one or more blocks), wherein each portion is associated with a start time and end time (e.g., a time window that begins at the start time and ends at the end time). Each portion includes a first delta snapshot that indicates one or more first changes to the intent policy model from an initial time associated with the intent policy model and the start time. Each portion may also include one or more additional delta snapshots that respectively indicate one or more incremental changes to the intent policy model between the start time and the end time. That is, each of the one or more additional delta snapshots indicates changes to the intent policy model at a particular time since a time associated with an immediately preceding delta snapshot in the portion of the data structure.

The NMS may update the data structure by generating delta snapshots and storing the delta snapshots in a portion of the data structure. In some implementations, the NMS may determine that additional delta snapshots are not to be stored in a portion of the data structure (e.g., because a size of the portion has become too large, the time window associated with the portion has elapsed, and/or other reasons). Accordingly, the NMS may process the delta snapshots in the portion to generate an accumulated delta snapshot and store that as the first delta snapshot in an additional portion of the data structure. The NMS then may update the data structure by generating delta snapshots and storing the delta snapshots in the additional portion of the data structure (e.g., until a time window associated with the additional portion of the data structure elapses).

In some implementations, the NMS may generate a differential deployment snapshot. For example, the NMS may receive a message indicating that the NMS is to deploy an updated version of the intent policy model at a deployment time to a network device. The NMS may identify a previous deployment time at which the system deployed a previous version of the intent policy model to the network device. Accordingly, the NMS may identify respective portions of the data structure associated with the previous deployment time and the deployment time and may generate the differential deployment snapshot based on at least one of the one or more additional delta snapshots included in the respective portions. In this way, the differential deployment snapshot may indicate one or more changes to the intent policy model from the previous deployment time to the deployment time. The NMS may thereby generate and provide device-level provisioning configuration information to the network device (e.g., to cause the updated version of the intent policy model to be deployed on the network device).

In some implementations, the NMS may generate a rollback deployment snapshot. For example, the NMS may receive a message indicating that the NMS is to deploy a previous version of the intent policy model to a network device. Accordingly, the NMS may identify a previous deployment time at which the system deployed the previous version of the intent policy model to the network device, and may identify a portion of the data structure associated with the previous deployment time. The NMS may generate the rollback deployment snapshot based on the first delta snapshot included in the portion, and, in some implementations, at least one of the one or more additional delta snapshots in the portion (e.g., that occurred before, or at the same time as, the previous deployment time). The NMS may thereby generate and provide device-level rollback configuration information to the network device (e.g., to cause the previous version of the intent policy model to be deployed on the network device).

In this way, the NMS enables efficient use of computing resources (e.g., processing resources, memory resources, communication resources, and/or power resources, among other examples) of the NMS and the network device. For example, by tracking incremental changes to an intent policy model at particular times using delta snapshots, the NMS uses less computing resources than a network management system that tracks total changes to an intent policy at particular times. Further, the NMS can more efficiently generate and provide device-level provisioning configuration information to the network device to cause an updated version of the intent policy model to be deployed on the network device. For example, less computing resources are used because only changes since a last deployment of device-level provisioning configuration information are included in the device-level provisioning configuration information, rather than all changes since an initial deployment.

Additionally, the NMS is configured to manage portions of a data structure, where each portion includes an accumulated delta snapshot and one or more additional incremental delta snapshots associated with a time window. In this way, the NMS optimizes storing and retrieval of the delta snapshots, and optimizes generation of device-level provisioning configuration information and device-level rollback configuration information (e.g., by allowing the NMS to use computing resources to process only relevant portions of the data structure, rather than the entire data structure).

FIGS. 1A-1I are diagrams of one or more example implementations 100 described herein. As shown in FIGS. 1A-1I, example implementation(s) 100 may include an NMS, and a network device. The NMS and the network device are described in more detail below in connection with FIGS. 2-4. As shown in FIGS. 1A-1I, the NMS may include an intent policy model management module, a snapshot module, and a provisioning module.

As shown in FIG. 1A, and by reference number 102, the NMS (e.g., using the intent policy model management module) may identify an intent policy model. The intent policy model may be a graph-based policy model, where intent policy objects (e.g., resources) are represented as vertices and relationships (e.g., associations) between intent policy objects are represented as edges, or another type of intent-based model.

As shown by reference number 104, the NMS (e.g., using the intent policy model management module) may generate a data structure, such as a repository, a database, a table, a file, or another type of data structure. The data structure may be configured to store delta snapshots associated with changes to the intent policy model, as described herein.

Figure 1B:
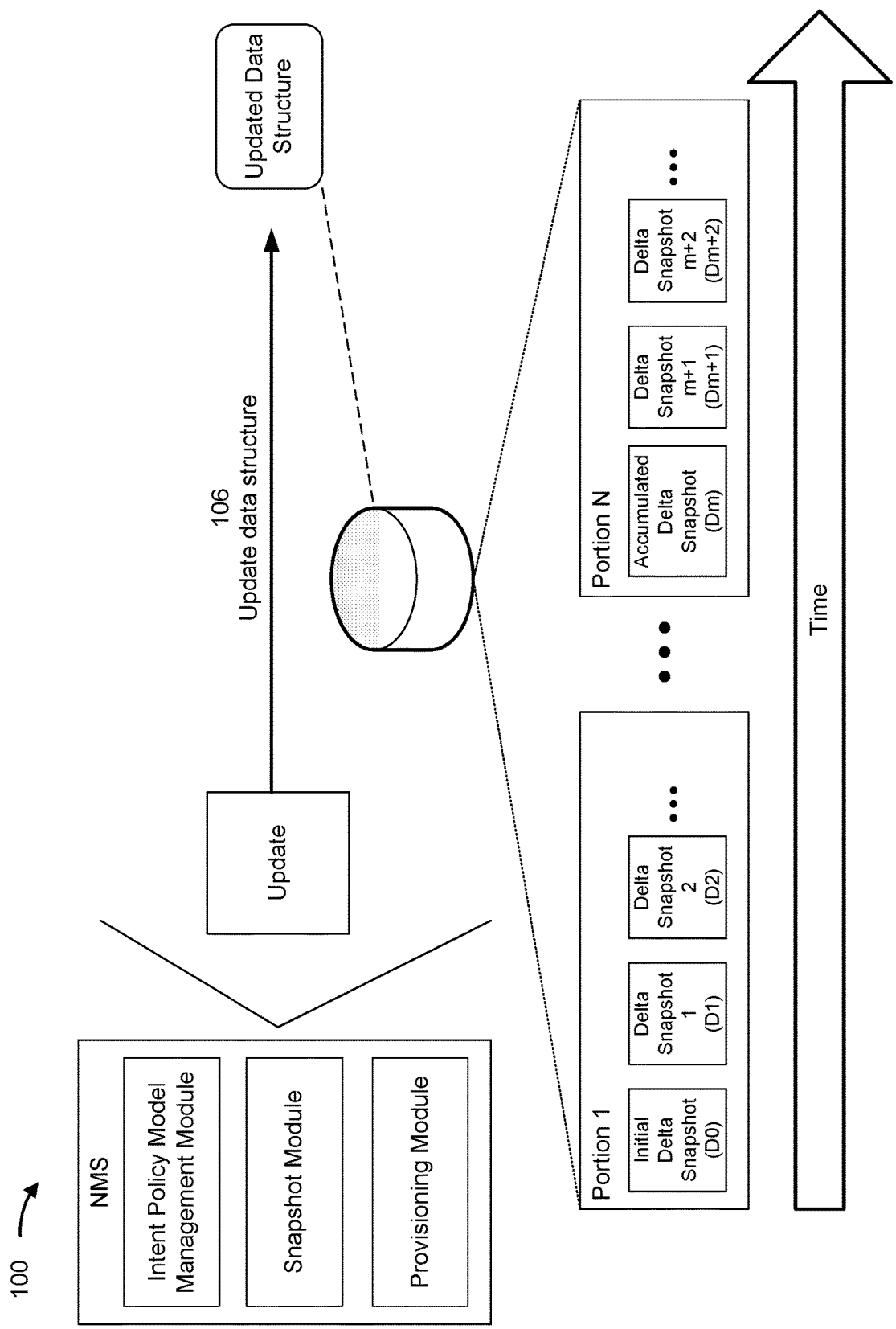

As shown in FIG. 1B, and by reference number 106, the NMS (e.g., using the snapshot module) may update the data structure. For example, the NMS may identify an initial time that is associated with the intent policy model, such as a time when the NMS identified the intent policy model (e.g., as described herein in relation to FIG. 1A and reference number 102). The initial time may indicate a time when the intent policy model has not yet changed (e.g., when the intent policy model is a "base" intent policy model). Accordingly, the NMS may update the data structure to include one or more portions (also referred to as one or more blocks). Each portion may be associated with a start time and end time (e.g., a time window that begins at the start time and ends at the end time). Further, each portion may include a first delta snapshot that indicates one or more first changes to the intent policy model from the initial time to the start time associated with the portion, and one or more additional delta snapshots that respectively indicate one or more incremental changes to the intent policy model at times between the start time and the end time associated with the portion of the data structure.

As a specific example, as shown in FIG. 1B, the NMS may generate an initial delta snapshot (D0) that indicates one or more first changes to the intent policy model from the initial time to a first time T1. In some implementations, the D0 may be generated prior to any changes being made to the intent policy model, so the D0 may be initialized to be empty (e.g., initialized to be nil or to another value indicating that the intent policy model has not changed from the initial time to the first time T1). The NMS then may store the D0 in a first portion (Portion 1) of the data structure. Accordingly, the first time T1 may be the start time of the time window of the Portion 1 of the data structure. After storing D0, the NMS may generate a first delta snapshot (D1) that indicates one or more changes to the intent policy model from the first time T1 to a second time T2, and may store the D1 in the Portion 1 of the data structure; may generate, after storing the D1, a second delta snapshot (D2) that indicates one or more changes to the intent policy model from the second time T2 to a third time T3, and may store the D2 in the Portion 1 of the data structure; and so on.

In some implementations, the NMS may determine (e.g., after storing one or more delta snapshots in the Portion 1 of the data structure) that additional delta snapshots are not to be stored in the Portion 1 of the data structure. For example, the NMS may determine that additional delta snapshots are not to be stored in the Portion 1 of the data structure based on the NMS determining that a time duration threshold is satisfied (e.g., that a total amount of time since the start time of the Portion 1 of the data structure, the first time T1, is greater than or equal to the time duration threshold, which may be greater than or equal to 12 hours, 1 day, 5 days, 1 week, 2 weeks, and/or 1 month, among other examples); that a delta snapshot number threshold is satisfied (e.g., that a total number of delta snapshots stored in the Portion 1 of the data structure is greater than or equal to the delta snapshot number threshold, which may be greater than or equal to 5, 10, 15, 25, 50, and/or 100, among other examples); and/or that a resource number threshold is satisfied (e.g., that a total number of resources identified by the delta snapshots stored in the Portion of the data structure is greater than or equal to the resource number threshold, which may be greater than or equal to 50, 100, 150, 250, 500, and/or 1000, among other examples).

The NMS may make the determination that additional delta snapshots are not to be stored in the Portion 1 of the data structure at a time Td. Accordingly, the time Td may be the end time of the time window of the Portion 1 of the data structure. That is, the time window of the Portion 1 of the data structure may be from the first Time T1 to the time Td, where each snapshot included in the Portion 1 of the data structure is associated with a time that is greater than or equal to the first time T1 and less than the time Td. Accordingly, the NMS may generate (e.g., based on each snapshot included in the Portion 1 of the data structure) an accumulated delta snapshot (Dd) that indicates one or more changes to the intent policy model from first time T1 to the Time Td. That is, the Dd may indicate the one or more changes indicated by the D0, the one or more changes indicated by the D1, the one or more changes indicated by the D2, and so on. The NMS then may store the Dd in a second portion (Portion 2) of the data structure. Accordingly, the time Td may be the start time of the time window of the Portion 2 of the data structure.

The NMS may generate and store one or more additional delta snaps shots in the Portion 2 of the data structure in a similar manner as that described above in relation to Portion 1 of the data structure (e.g., one or more additional delta snapshots that respectively indicate one or more incremental changes to the intent policy model at times from the start time associated with the Portion 2 of the data structure, the time Td). For example, the NMS may generate another delta snapshot that indicates one or more changes to the intent policy from the time Td to a time Td+1, and may store the other delta snapshot in the Portion 2 of the data structure. The NMS then may make the determination that additional delta snapshots are not to be stored in the Portion 2, such as at a time Te. Accordingly, the time Te may be the end time of the time window of the Portion 2 of the data structure. That is, the time window of the Portion 2 of the data structure may be from the time Td to the time Te, where each snapshot included in the Portion 2 of the data structure is associated with a time that is greater than or equal to the first time Td and less than the time Te.

The NMS may continue to generate and store delta snapshots in one or more additional portions of the data structure in the manner described above. Accordingly, as shown in FIG. 1B, the NMS may update the data structure to include a Portion N that includes a first delta snapshot (e.g., an accumulated delta snapshot Dm) that indicates one or more changes to the intent policy model from the initial time to a start time Tm associated with the Portion N. Further, the NMS may update the data structure to cause the Portion N to include one or more additional delta snapshots (e.g., Dm+1, Dm+2, and so on) that respectively indicate one or more incremental changes to the intent policy model at times from the start time and to the end time associated with the Portion N of the data structure.

FIG. 1C shows an example delta snapshot that is generated by the NMS. The delta snapshot may indicate one or more resources, of the intent policy model, that have changed (e.g., since the first time T1, or since a previous snapshot was generated) and a time (e.g., when the delta snapshot is created). For each resource, the delta snapshot may indicate a name associated with the resource, an operation associated with the resource, and/or resource information associated with the resource, among other examples. The name may be a unique identifier of the resource. The operation may be a create operation that indicates that the resource was created, an update operation that indicates that the resource was updated, a delete operation that indicates that the resources was deleted, or a "no-op" operation that indicates that the resource was affected by a change to another resource, among other examples. The resource information (e.g., that may be an information "blob") may include information about the resource (e.g., a policy associated with the resource) and/or information about the resource's relationship with other resources (e.g., a dependent relationship, a correlated relationship, and/or another type of relationship).

Figure 1D:
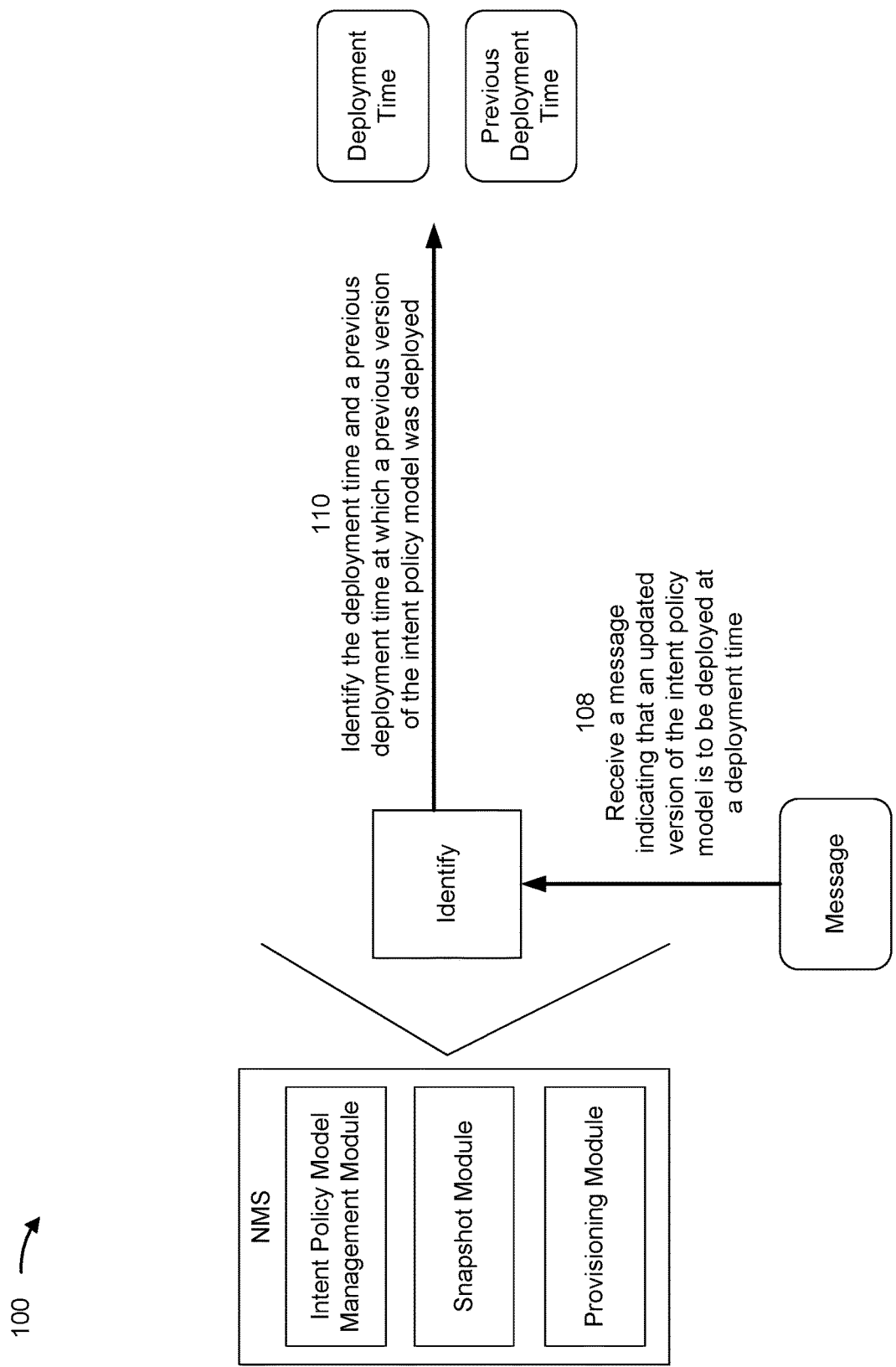

As shown in FIG. 1D, and by reference number 108, the NMS (e.g., using the intent policy model management module) may receive a message. The message may indicate that the NMS is to deploy an updated version of the intent policy model to a device, such as the network device, at a deployment time. For example, the NMS may receive the message from the network device, or another device (e.g., a user device associated with an administrator of the network device).

As shown by reference number 110, the NMS (e.g., using the snapshot module) may identify (e.g., based on the message) the deployment time and a previous deployment time at which a previous version of the intent policy model was deployed to the device. For example, the NMS may process (e.g., read and/or parse) the message to identify the deployment time and the device. The NMS may search, based on the identified device, another data structure (e.g., another data structure than that described herein in relation to FIGS. 1A-1B), for an entry that indicates the previous deployment time and the previous version of the intent policy model. The NMS may process (e.g., read and/or parse) the entry to identify the previous deployment time.

Figure 1E:
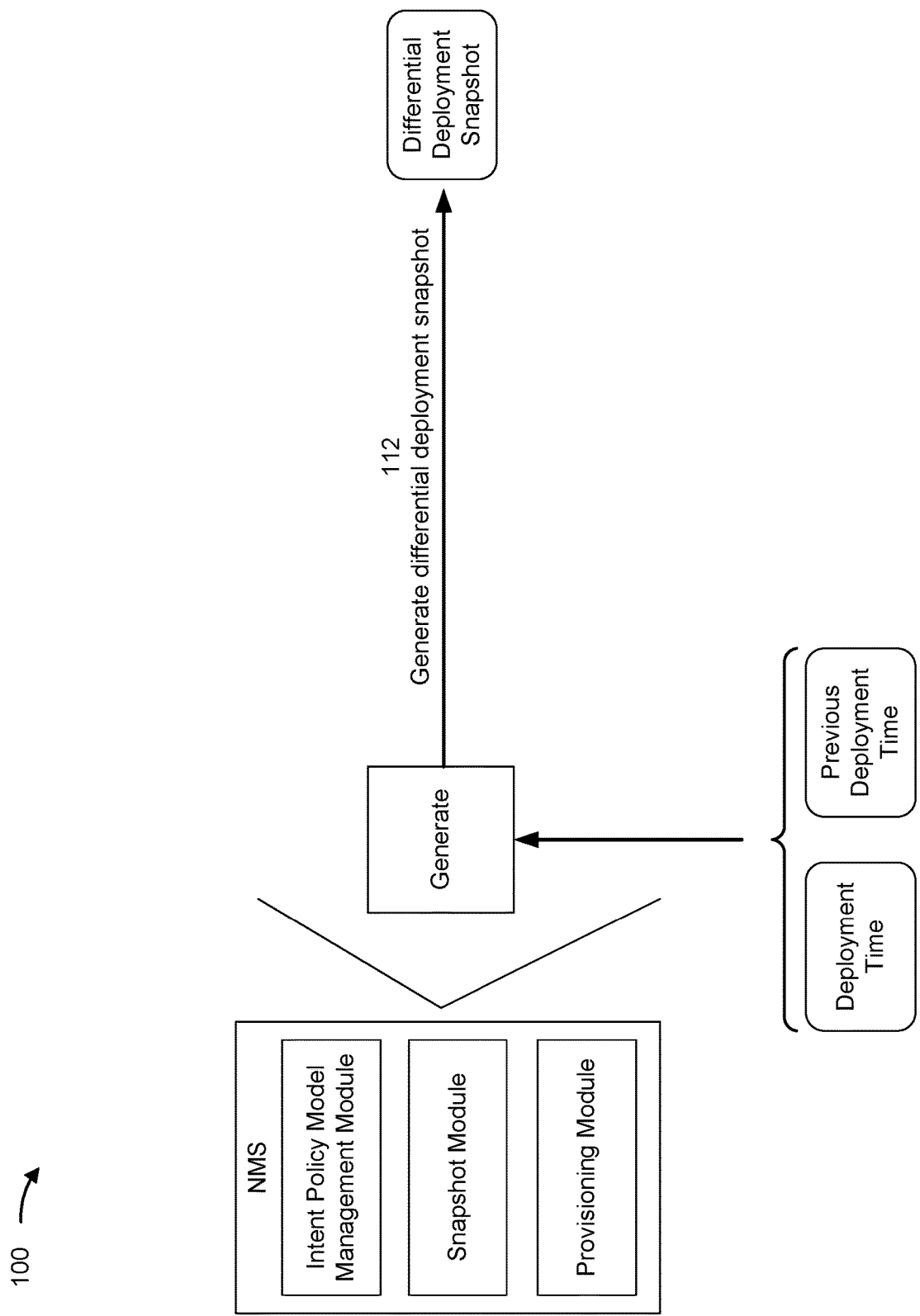

As shown in FIG. 1E, and by reference number 112, the NMS (e.g., using the snapshot module) may generate a differential deployment snapshot (e.g., based on the deployment time and/or the previous deployment time). For example, the NMS may identify a first portion of the data structure (e.g., that the NMS generated and updated, as described herein in relations to FIGS. 1A-1B) that is associated with the previous deployment time, and a second portion of the data structure (e.g., that is the same as, or, alternatively, different than, the first portion of the data structure) that is associated with the deployment time. The NMS may generate the differential deployment snapshot based on at least one delta snapshot included in the first portion and/or at least one delta snapshot included in the second portion. For example, the NMS may generate the differential deployment snapshot to include the one or more delta snapshots included in the first portion and the second portion (and any intervening portions) that indicate one or more changes to the intent policy model from the previous deployment time to the deployment time (e.g., the one or more delta snapshots that indicate incremental changes, not accumulated changes). The NMS may generate the differential deployment snapshot according to the following formula: $D_{diff} = \text{Portion}_A \Sigma_{i=pd}^{a\_end} D_i + \ldots + \text{Portion}_B \Sigma_{j=b\_start}^{d} D_j$, where $D_{diff}$ is the differential deployment snapshot, $\text{Portion}_A$ is the first portion of the data structure, pd is the previous deployment time, a_end is the end time associated with a time window associated with the first portion, $D_i$ is a delta snapshot of the first portion at time i, $\text{Portion}_B$ is the second portion of the data structure, d is the deployment time, b_start is the start time associated with a time window associated with the second portion, and $D_j$ is a delta snapshot of the second portion at time j. In this way, the differential deployment snapshot may indicate one or more changes to the intent policy model from the previous deployment time to the deployment time (e.g., one or more changes associated with a time that is greater than or equal to the previous deployment time and less than the deployment time).

In some implementations, the NMS may generate the differential deployment snapshot (e.g., a final version of the differential deployment snapshot) by incrementally adding a delta snapshot to an intermediate version of the differential deployment snapshot. Accordingly, in some implementations, prior to adding a delta snapshot, the intermediate version of the differential deployment snapshot may indicate a first operation associated with a resource, while a delta snapshot that is to be added to the intermediate version of the differential deployment snapshot may indicate a second operation associated with the resource. To add the delta snapshot to the intermediate version of the differential deployment snapshot, the NMS may change the operation and/or resource information associated with the resource indicated by the intermediate version of the differential deployment snapshot. For example, when the first operation is a create operation or an update operation, and the second operation is an update operation, the NMS may update the intermediate version of the differential deployment snapshot to indicate an update operation associated with the resource and resource information that indicates both the first operation and the second operation. As another example, when the first operation is a delete operation, and the second operation is a create operation, the NMS may update the intermediate version of the differential deployment snapshot to indicate an update operation associated with the resource and resource information that indicates both the first operation and the second operation. In an additional example, when the first operation is a create operation or an update operation, and the second operation is a delete operation, the NMS may update the intermediate version of the differential deployment snapshot to indicate a delete operation associated with the resource and resource information that indicates both the first operation and the second operation.

Figure 1F:
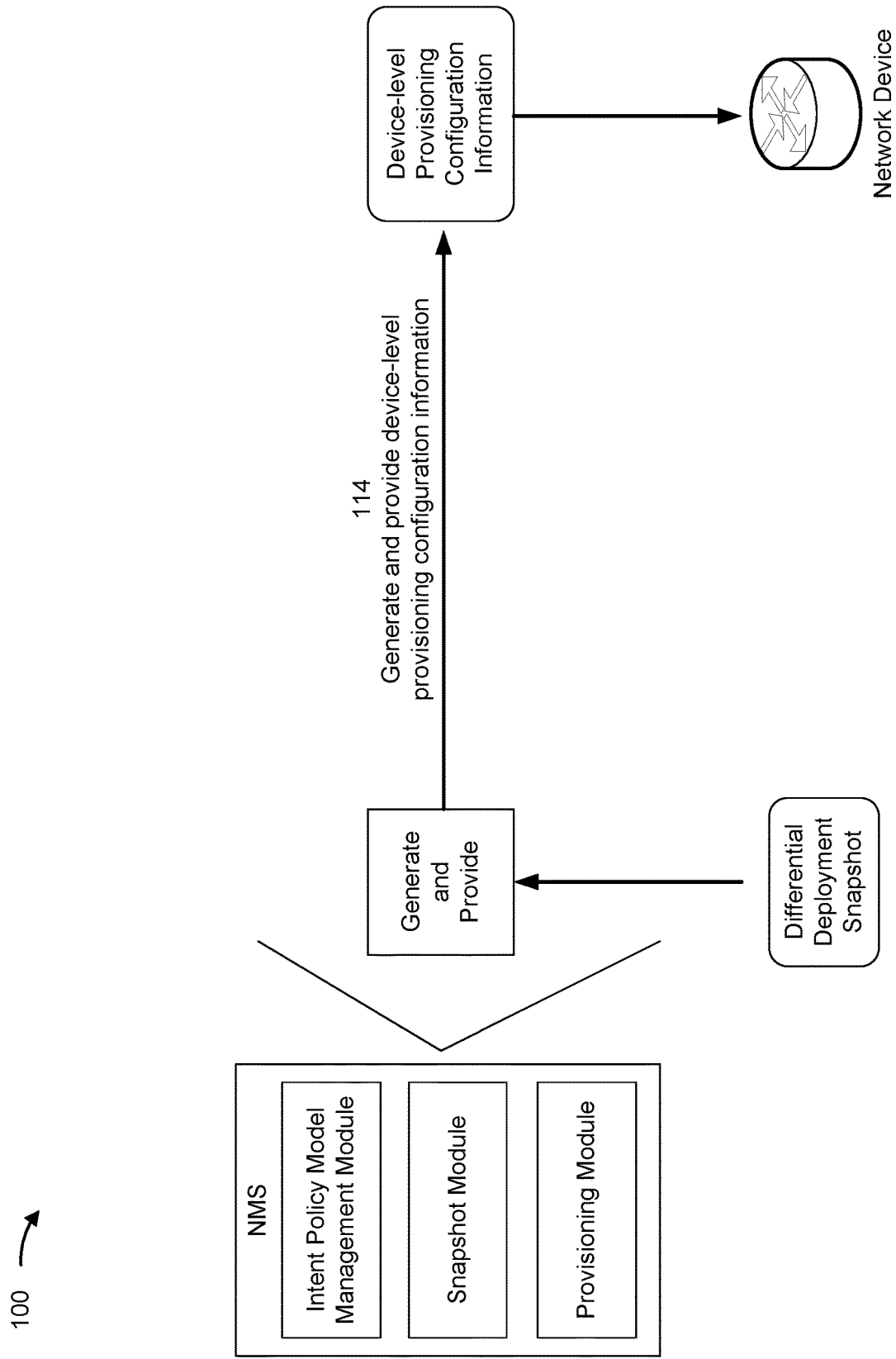

As shown in FIG. 1F, and by reference number 114, the NMS (e.g., using the provisioning module) may generate and provide device-level provisioning configuration information (e.g., based on the differential deployment snapshot). For example, the NMS may translate the differential deployment snapshot to device-level provisioning configuration information for the network device (e.g., based on information related to the resources and capabilities of the network device that is accessible to the NMS). The NMS may send the device-level provisioning configuration information to the network device. The network device then may process the device-level provisioning configuration information to include the one or more changes to the intent policy model from the previous deployment time to the deployment time. In this way, providing the device-level provisioning configuration information permits the updated version of the intent policy model to be deployed on the network device.

Figure 1G:
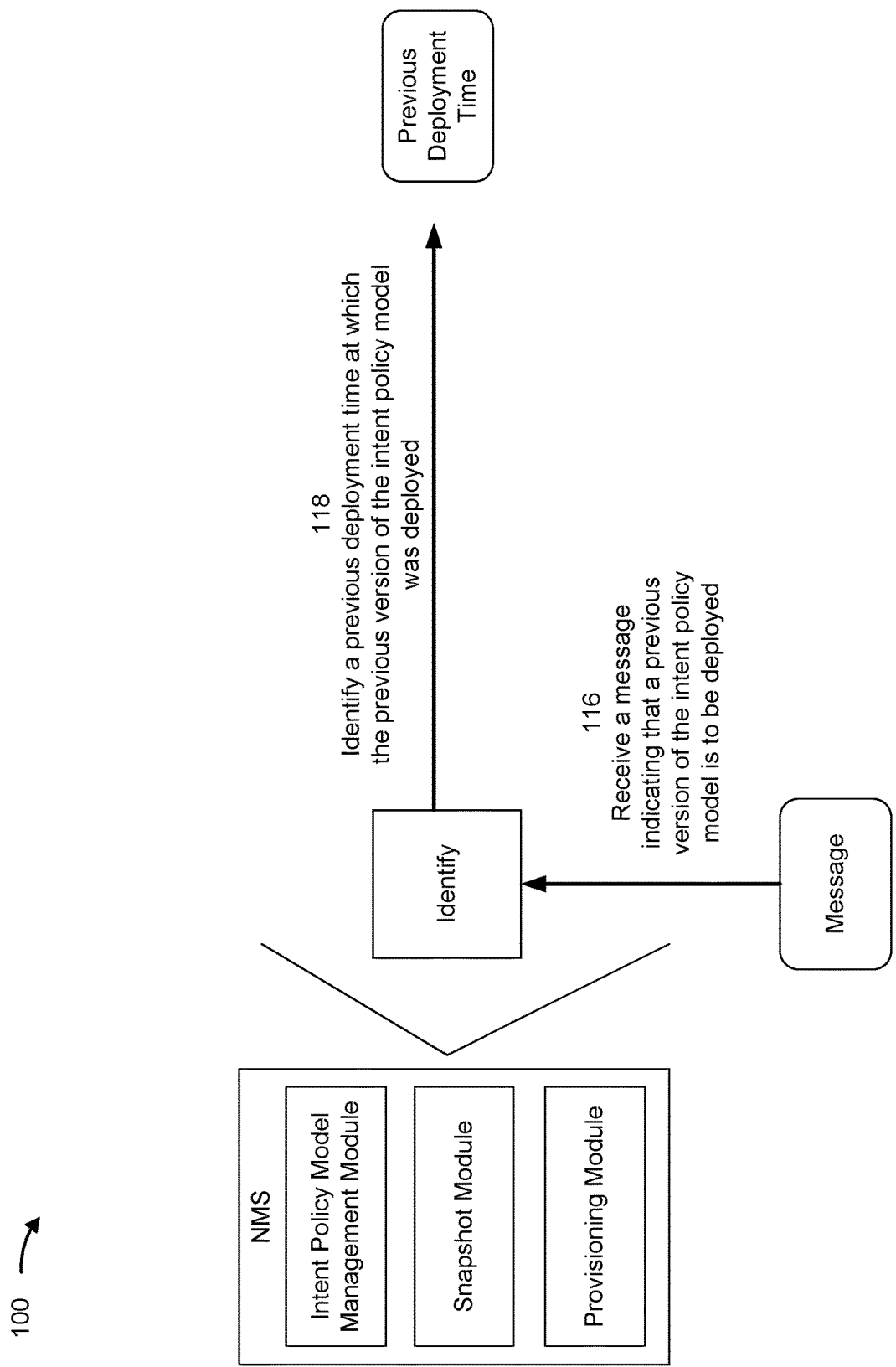

As shown in FIG. 1G, and by reference number 116, the NMS (e.g., using the intent policy model management module) may receive a message. The message may indicate that the NMS is to deploy a previous version of the intent policy model to a device, such as the network device. For example, the NMS may receive the message from the network device, or another device (e.g., a user device associated with an administrator of the network device). As shown by reference number 118, the NMS (e.g., using the snapshot module) may identify (e.g., based on the message) a previous deployment time at which the previous version of the intent policy model was deployed to the device (e.g., in a similar manner as that described herein in relation to FIG. 1D and reference number 110).

Figure 1H:
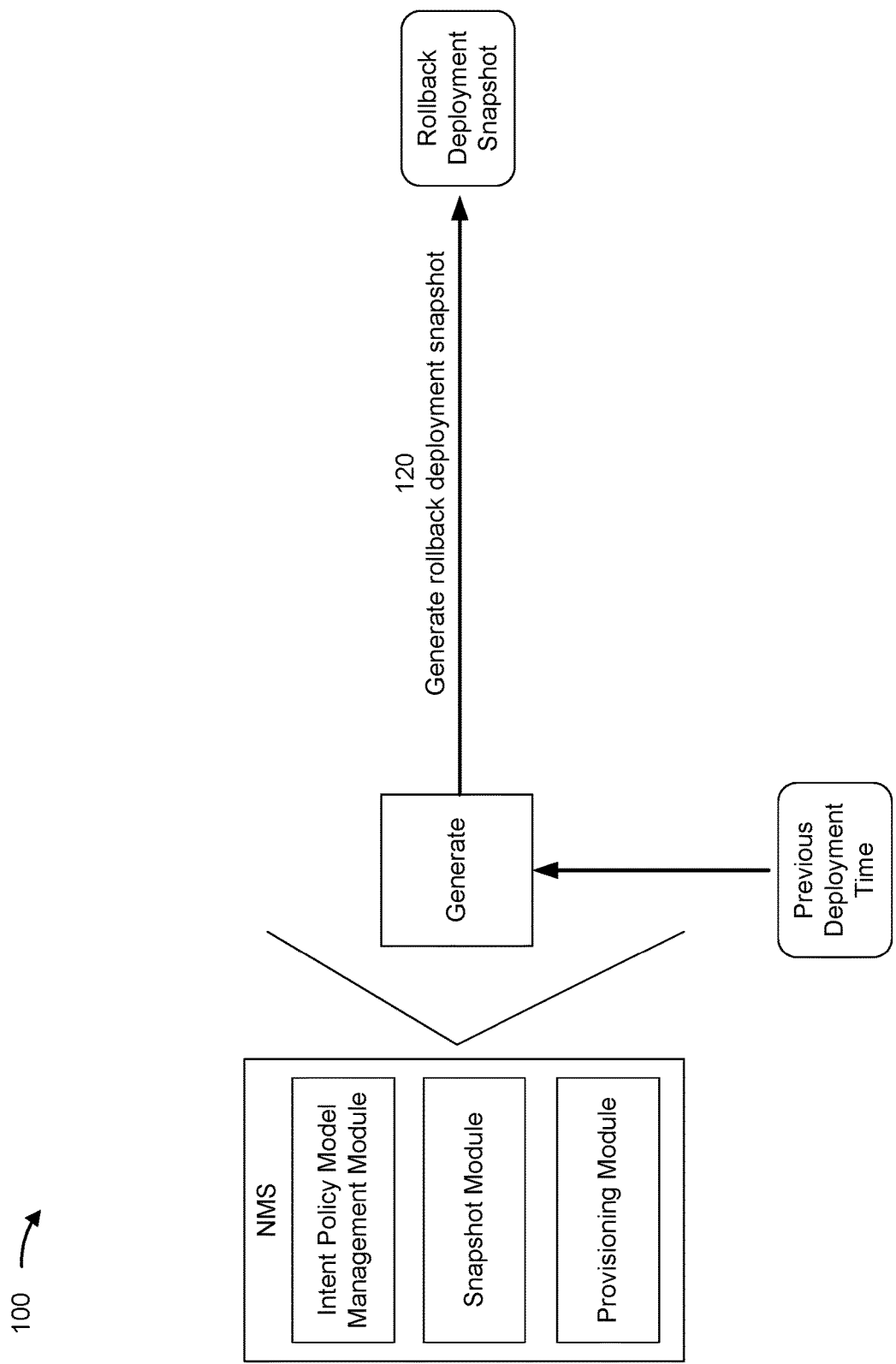

As shown in FIG. 1H, and by reference number 120, the NMS (e.g., using the snapshot module) may generate a rollback deployment snapshot (e.g., based on the previous deployment time). For example, the NMS may identify a portion of the data structure (e.g., that the NMS generated and updated, as described herein in relations to FIGS. 1A-1B) that is associated with the previous deployment time. The NMS may generate the rollback deployment snapshot based on at least one delta snapshot included in the portion. For example, the NMS may generate the rollback deployment snapshot to include the accumulated delta snapshot included in the portion, and, in some implementations, to include one or more delta snapshots in the portion that indicate one or more changes to the intent policy model from a start time of the portion to the previous deployment time. The NMS may generate the differential deployment snapshot according to the following formula: $D_{roll} = D_A + Portion_A \Sigma_{i=a\_start}^{pd} D_i$, where $D_{roll}$ is the rollback deployment snapshot, $Portion_A$ is the portion of the data structure, $D_A$ is the accumulated delta snapshot in the portion, pd is the previous deployment time, a_start is the start time associated with a time window associated with the portion, and $D_i$ is a delta snapshot in the portion at time i. In this way, the rollback deployment snapshot may indicate one or more changes to the intent policy model from the initial time to the previous deployment time (e.g., one or more change associated with a time that is greater than or equal to the initial time and less than or equal to the previous deployment time).

In some implementations, the NMS may generate the rollback deployment snapshot (e.g., a final version of the rollback deployment snapshot) by incrementally adding a delta snapshot to an intermediate version of the rollback deployment snapshot. Accordingly, in some implementations, prior to adding a delta snapshot, the intermediate version of the rollback deployment snapshot may indicate a first operation associated with a resource, while a delta snapshot that is to be added to the intermediate version of the rollback deployment may indicate a second operation associated with the resource. To add the delta snapshot to the intermediate version of the rollback deployment snapshot, the NMS may change the operation and/or resource information associated with the resource indicated by the intermediate version of the rollback deployment snapshot (e.g., in a similar manner as that described herein in relation to FIG. 1E).

Figure 1I:
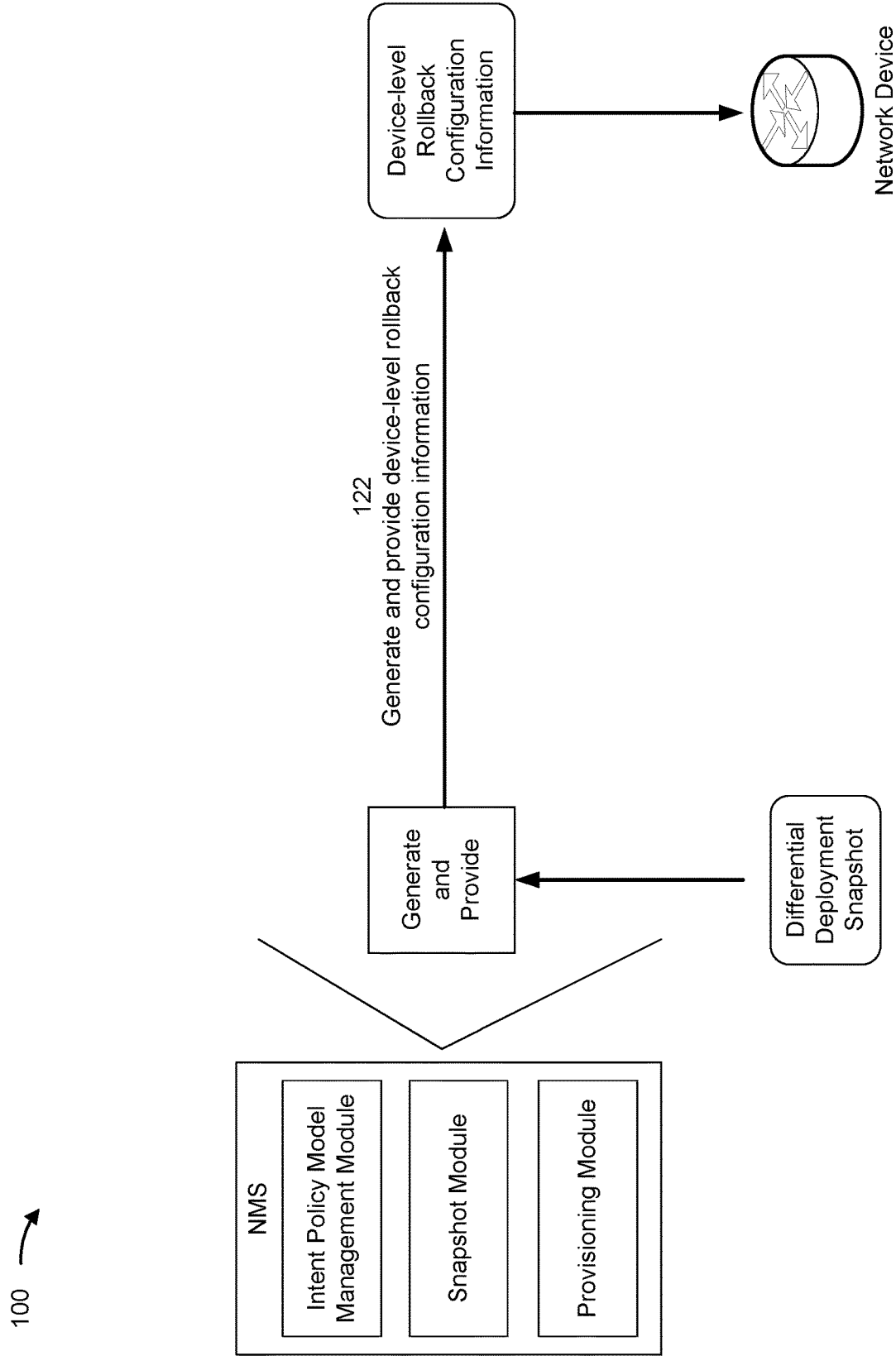

As shown in FIG. 1I, and by reference number 122, the NMS (e.g., using the provisioning module) may generate and provide device-level rollback configuration information (e.g., based on the rollback deployment snapshot). For example, the NMS may translate the rollback deployment snapshot to device-level rollback configuration information for the network device (e.g., based on information related to the resources and capabilities of the network device that is accessible to the NMS). The NMS may send the device-level rollback configuration information to the network device. The network device then may process the device-level rollback configuration information to include the one or more changes to the intent policy model from the initial deployment time to the previous deployment time. In this way, providing the device-level rollback configuration information permits the previous version of the intent policy model to be deployed on the network device.

As indicated above, FIGS. 1A-1I are provided merely as one or more examples. Other examples may differ from what is described with regard to FIGS. 1A-1I.

Figure 2:
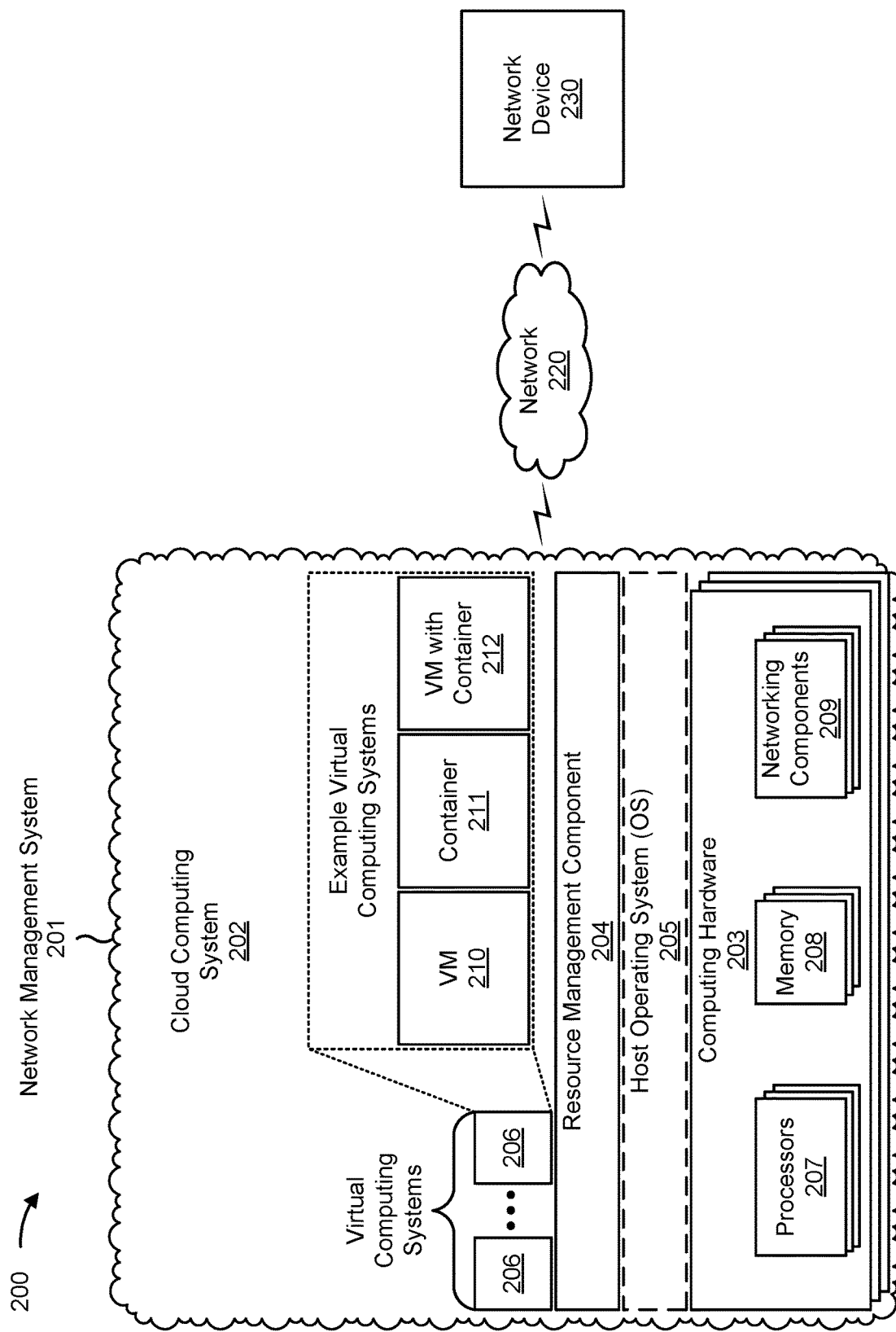
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a network management system 201, which may include one or more elements of and/or may execute within a cloud computing system 202. The cloud computing system 202 may include one or more elements 203-212, as described in more detail below. As further shown in FIG. 2, environment 200 may include a network 220 and/or a network device 230. Devices and/or elements of environment 200 may interconnect via wired connections and/or wireless connections.

The cloud computing system 202 may include computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

The computing hardware 203 may include hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, and/or one or more networking components 209. Examples of a processor, a memory, and a networking component (e.g., a communication component) are described elsewhere herein.

The resource management component 204 may include a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 210. Additionally, or alternatively, the resource management component 204 may include a container manager, such as when the virtual computing systems 206 are containers 211. In some implementations, the resource management component 204 executes within and/or in coordination with a host operating system 205.

A virtual computing system 206 may include a virtual environment that enables cloud-based execution of operations and/or processes described herein using computing hardware 203. As shown, a virtual computing system 206 may include a virtual machine 210, a container 211, or a hybrid environment 212 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the network management system 201 may include one or more elements 203-212 of the cloud computing system 202, and/or may execute within the cloud computing system 202, and/or may be hosted within the cloud computing system 202, in some implementations, the network management system 201 may not be cloud-based (e.g., may be implemented outside of a cloud computing system) or may be partially cloud-based. For example, the network management system 201 may include one or more devices that are not part of the cloud computing system 202, such as device 300 of FIG. 3 or device 400 of FIG. 4, which may include a standalone server or another type of computing device. The network management system 201 may perform one or more operations and/or processes described in more detail elsewhere herein.

The network 220 may include one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The network device 230 includes one or more devices capable of receiving, processing, storing, routing, and/or providing traffic (e.g., a packet or other information or metadata) in a manner described herein. For example, the network device 230 may include a router, such as a label switching router (LSR), a label edge router (LER), an ingress router, an egress router, a provider router (e.g., a provider edge router or a provider core router), a virtual router, or another type of router. Additionally, or alternatively, the network device 230 may include a gateway, a switch, a firewall, a hub, a bridge, a reverse proxy, a server (e.g., a proxy server, a cloud server, or a data center server), a load balancer, and/or a similar device. In some implementations, the network device 230 may be a physical device implemented within a housing, such as a chassis. In some implementations, the network device 230 may be a virtual device implemented by one or more computer devices of a cloud computing environment or a data center. In some implementations, a group of network devices 230 may be a group of data center nodes that are used to route traffic flow through network 220.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
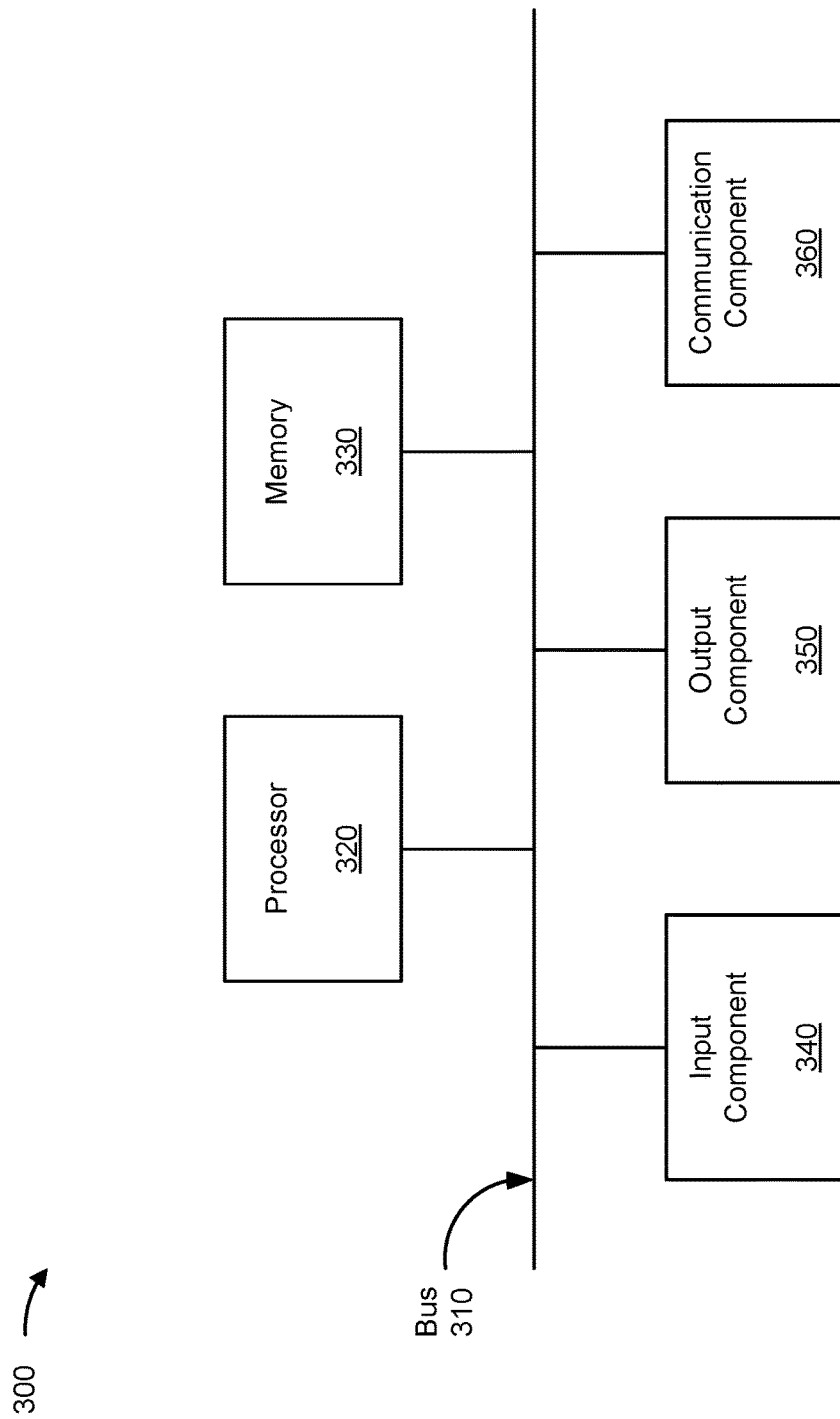
FIG. 3 is a diagram of example components of a device associated with using delta snapshots to facilitate intent policy model rollback and deployment.

FIG. 3 is a diagram of example components of a device 300 associated with using delta snapshots to facilitate intent policy model rollback and deployment. The device 300 may correspond to the network management system 201, the computing hardware 203, and/or the network device 230. In some implementations the network management system 201, the computing hardware 203, and/or the network device 230 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 may enable the device 300 to provide output, such as via a display, a speaker, and/or a lightemitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
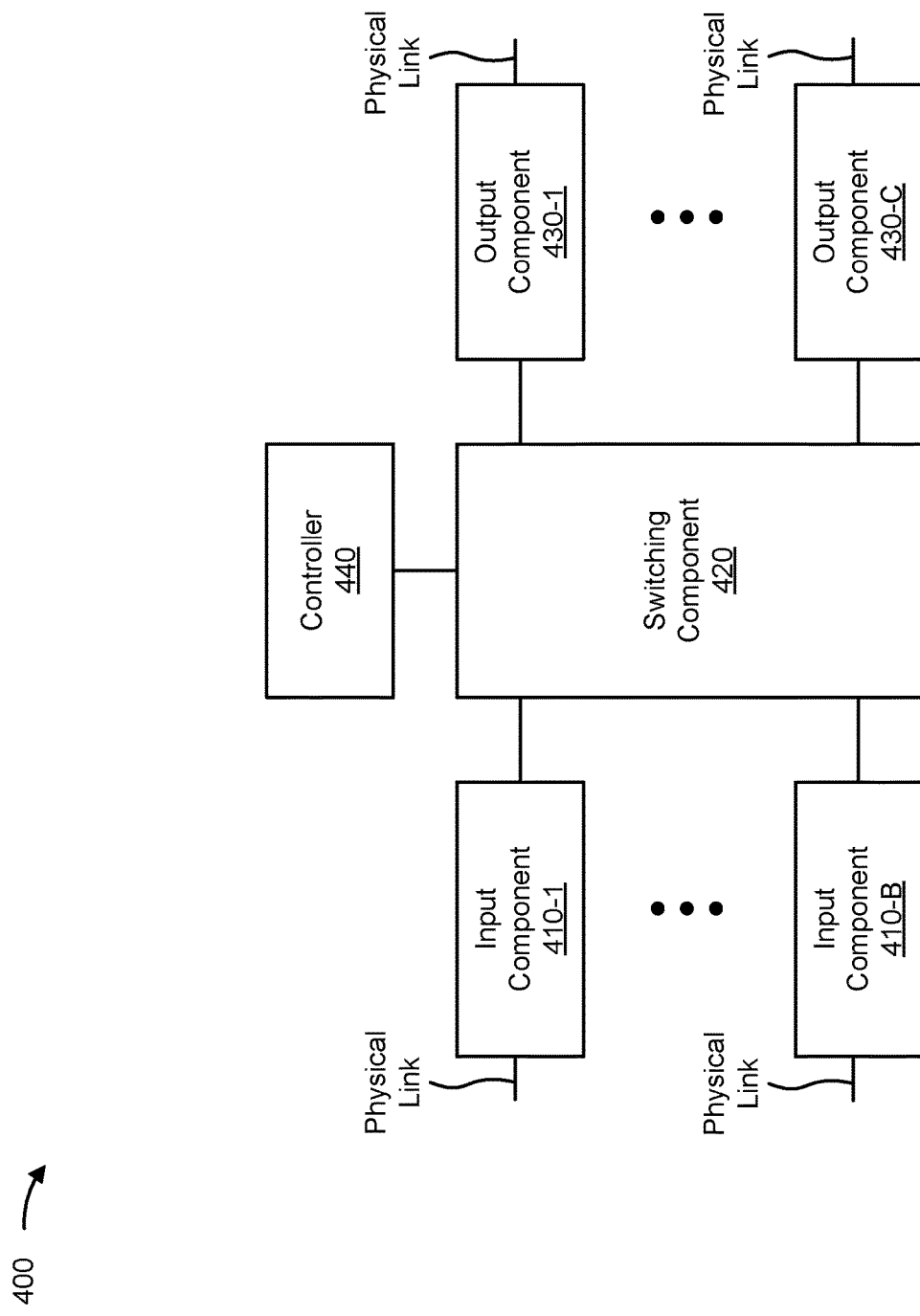
FIG. 4 is a diagram of example components of a device associated with using delta snapshots to facilitate intent policy model rollback and deployment.

FIG. 4 is a diagram of example components of a device 400 associated with using delta snapshots to facilitate intent policy model rollback and deployment. Device 400 may correspond to the network management system 201, the computing hardware 203, and/or the network device 230. In some implementations, the network management system 201, the computing hardware 203, and/or the network device 230 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a graphics processing unit (GPU), an accelerated processing unit (APU), a microprocessor, a microcontroller, a digital signal processor (DSP), a field-programmable gate array (FPGA), an application specific integrated circuit (ASIC), and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
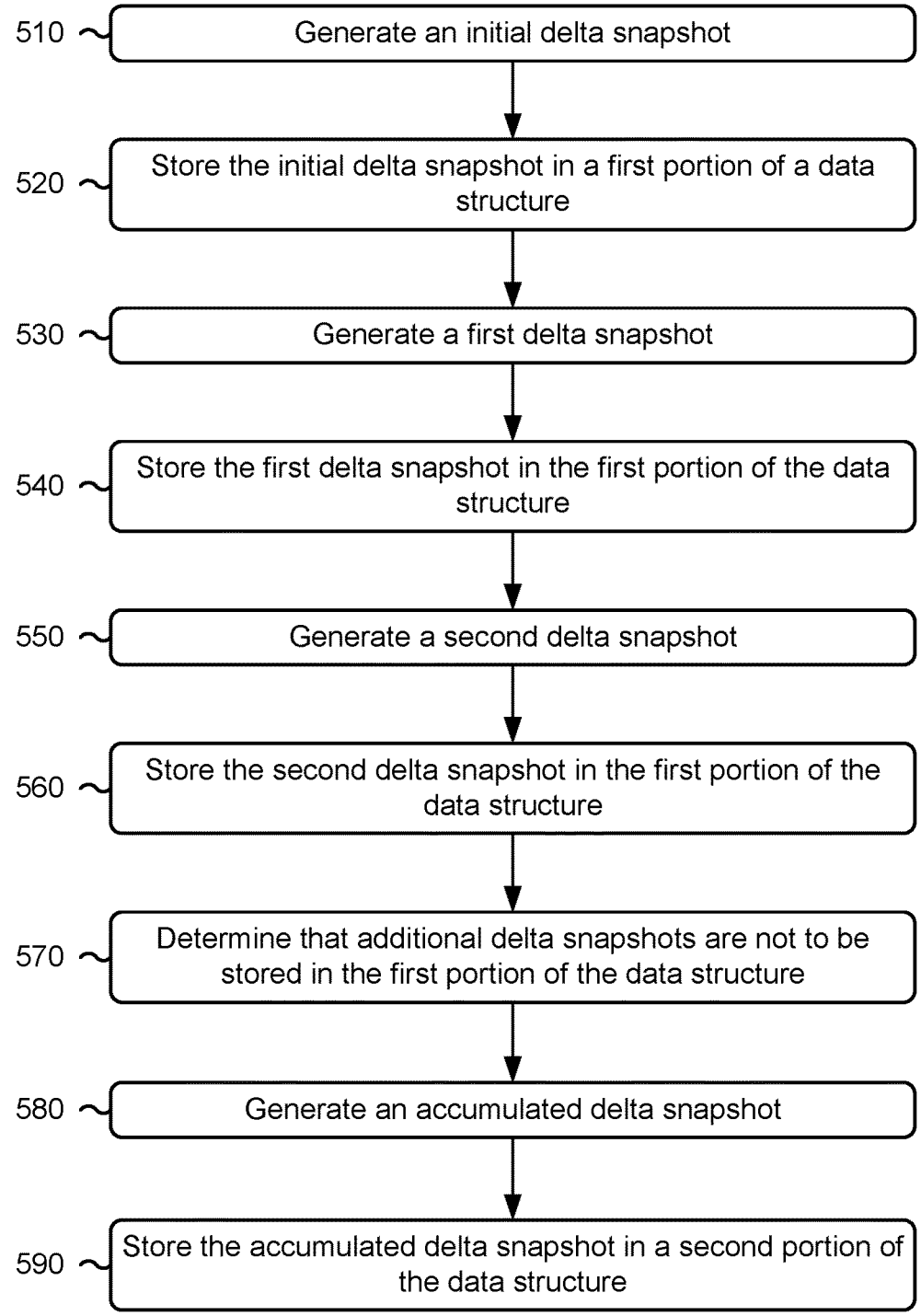
FIG. 5 is a flowchart of an example process associated with using delta snapshots to facilitate intent policy model rollback and deployment.

FIG. 5 is a flowchart of an example process 500 associated with using delta snapshots to facilitate intent policy model rollback and deployment. In some implementations, one or more process blocks of FIG. 5 are performed by a system (e.g., the network management system 201). In some implementations, one or more process blocks of FIG. 5 are performed by another device or a group of devices separate from or including the system, such as a network device (e.g., the network device 230). Additionally, or alternatively, one or more process blocks of FIG. 5 may be performed by one or more components of device 300, such as processor 320, memory 330, input component 340, output component 350, and/or communication component 360; one or more components of device 400, such as input component 410, switching component 420, output component 430, and/or controller 440; and/or one or more components of another device.

As shown in FIG. 5, process 500 may include generating an initial delta snapshot (block 510). For example, the system may generate an initial delta snapshot that indicates one or more first changes to an intent policy model from an initial time to a first time, as described above.

As further shown in FIG. 5, process 500 may include storing the initial delta snapshot in a first portion of a data structure (block 520). For example, the system may store the initial delta snapshot in a first portion of a data structure, as described above.

As further shown in FIG. 5, process 500 may include generating a first delta snapshot (block 530). For example, the system may generate, after storing the initial delta snapshot, a first delta snapshot that indicates one or more second changes to the intent policy model from the first time to a second time, as described above.

As further shown in FIG. 5, process 500 may include storing the first delta snapshot in the first portion of the data structure (block 540). For example, the system may store the first delta snapshot in the first portion of the data structure, as described above.

As further shown in FIG. 5, process 500 may include generating a second delta snapshot (block 550). For example, the system may generate, after storing the first delta snapshot, a second delta snapshot that indicates one or more third changes to the intent policy model from the second time to a third time, as described above.

As further shown in FIG. 5, process 500 may include storing the second delta snapshot in the first portion of the data structure (block 560). For example, the system may store the second delta snapshot in the first portion of the data structure, as described above.

As further shown in FIG. 5, process 500 may include determining that additional delta snapshots are not to be stored in the first portion of the data structure (block 570). For example, the system may determine, after storing the second delta snapshot, that additional delta snapshots are not to be stored in the first portion of the data structure, as described above.

As further shown in FIG. 5, process 500 may include generating an accumulated delta snapshot (block 580). For example, the system may generate, based on determining that additional delta snapshots are not be stored in the first portion of the data structure, and based on the initial delta snapshot, the first delta snapshot, and the second delta snapshot, an accumulated delta snapshot, as described above. The accumulated delta snapshot may indicate the one or more first changes, the one or more second changes, and the one or more third changes to the intent policy model from the initial time to the third time.

As further shown in FIG. 5, process 500 may include storing the accumulated delta snapshot in a second portion of the data structure (block 590). For example, the system may store the accumulated delta snapshot in a second portion of the data structure, as described above.

Process 500 may include additional implementations, such as any single implementation or any combination of implementations described below and/or in connection with one or more other processes described elsewhere herein.

In a first implementation, process 500 includes generating, after storing the accumulated delta snapshot, a third delta snapshot that indicates one or more fourth changes to the intent policy model from the third time to a fourth time, and storing the third delta snapshot in the second portion of the data structure.

In a second implementation, alone or in combination with the first implementation, determining that additional delta snapshots are not to be stored in the first portion of the data structure comprises at least one of determining that a total amount of time since the first time is greater than or equal to a time duration threshold, determining that a total number of delta snapshots stored in the first portion of the data structure is greater than or equal to a delta snapshot number threshold, or determining that a total number of resources identified by the delta snapshots stored in the first portion of the data structure is greater than or equal to a resource number threshold.

In a third implementation, alone or in combination with one or more of the first and second implementations, process 500 includes receiving, after storing the accumulated delta snapshot, a message indicating that the system is to deploy an updated version of the intent policy model at a deployment time to a device, identifying, based on the message, a previous deployment time at which the system deployed a previous version of the intent policy model to the device, and generating, based on the data structure, the previous deployment time, and the deployment time, a differential deployment snapshot.

In a fourth implementation, alone or in combination with one or more of the first through third implementations, generating the differential deployment snapshot comprises identifying a portion of the data structure associated with the previous deployment time, identifying another portion of the data structure associated with the deployment time, and generating, based on at least one delta snapshot included in the portion of the data structure and at least one delta snapshot included in the other portion of the data structure, the differential deployment snapshot.

In a fifth implementation, alone or in combination with one or more of the first through fourth implementations, process 500 includes generating, based on the differential deployment snapshot, device-level provisioning configuration information for the device, and providing the device-level provisioning configuration information to the device, wherein providing the device-level provisioning configuration information permits the updated version of the intent policy model to be deployed on the device.

In a sixth implementation, alone or in combination with one or more of the first through fifth implementations, process 500 includes receiving, after storing the accumulated delta snapshot, a message indicating that the system is to deploy a previous version of the intent policy model to a device, identifying, based on the message, a previous deployment time at which the system deployed the previous version of the intent policy model to the device, and generating, based on the data structure and the previous deployment time, a rollback deployment snapshot.

In a seventh implementation, alone or in combination with one or more of the first through sixth implementations, generating the rollback deployment snapshot comprises identifying a portion of the data structure associated with the previous deployment time, and generating, based on the accumulated delta snapshot included in the portion of the data structure, the rollback deployment snapshot.

In an eighth implementation, alone or in combination with one or more of the first through seventh implementations, process 500 includes generating, based on the rollback deployment snapshot, device-level rollback configuration information for the device, and providing the device-level rollback configuration information to the device, wherein providing the device-level rollback configuration information permits the previous version of the intent policy model to be deployed on the device.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

Figure 6:
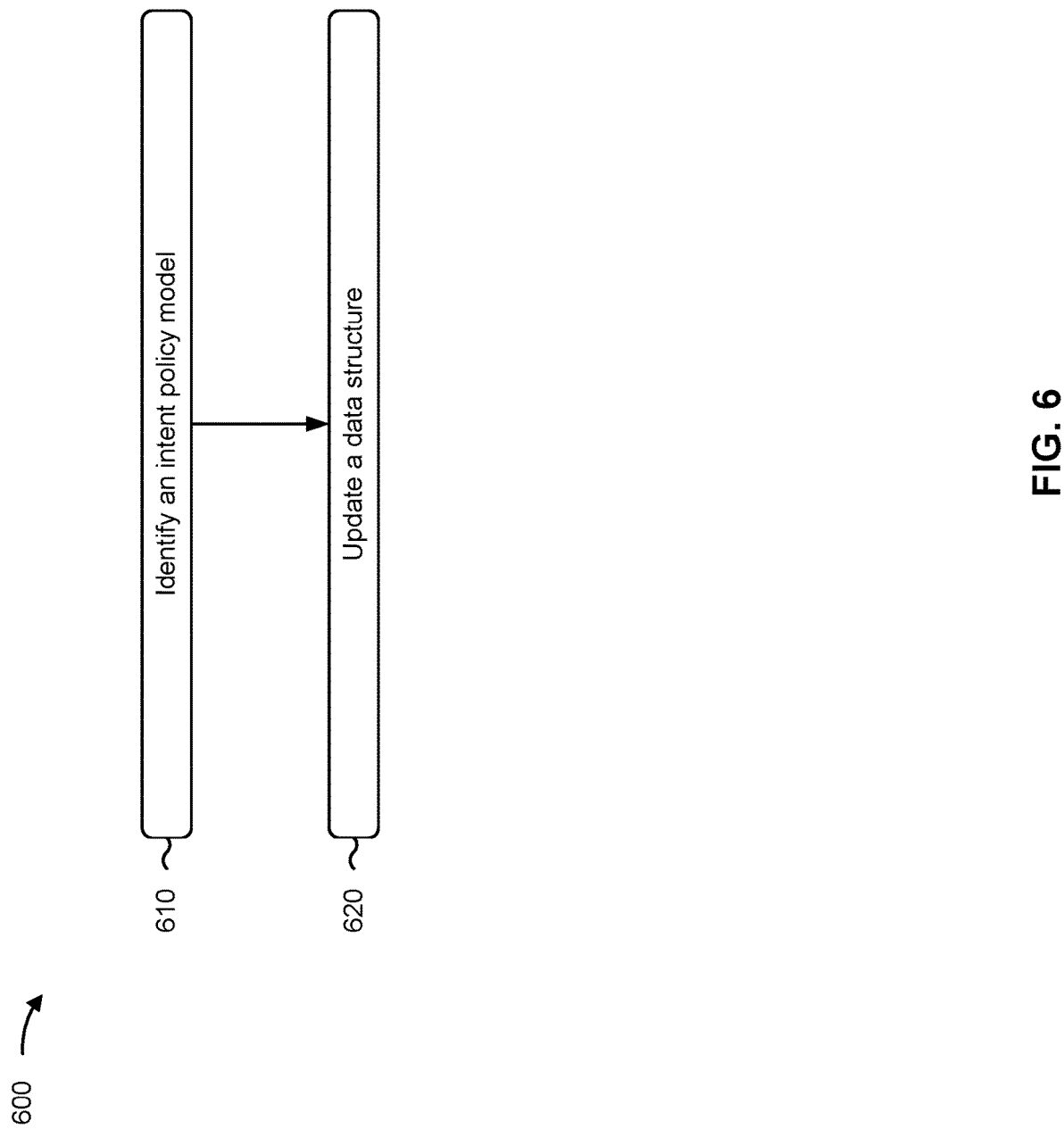
FIG. 6 is a flowchart of an example process associated with using delta snapshots to facilitate intent policy model rollback and deployment.

FIG. 6 is a flowchart of an example process 600 associated with using delta snapshots to facilitate intent policy model rollback and deployment. In some implementations, one or more process blocks of FIG. 6 are performed by a system (e.g., the network management system 201). In some implementations, one or more process blocks of FIG. 6 are performed by another device or a group of devices separate from or including the system, such as a network device (e.g., the network device 230). Additionally, or alternatively, one or more process blocks of FIG. 6 may be performed by one or more components of device 300, such as processor 320, memory 330, input component 340, output component 350, and/or communication component 360; one or more components of device 400, such as input component 410, switching component 420, output component 430, and/or controller 440; and/or one or more components of another device.

As shown in FIG. 6, process 600 may include identifying an intent policy model (block 610). For example, the system may identify an intent policy model associated with an initial time, as described above.

As further shown in FIG. 6, process 600 may include updating a data structure (block 620). For example, the system may update a data structure to cause the data structure to include one or more portions, as described above. In some implementations, each portion of the data structure is associated with a start time and an end time, and each portion includes: a first delta snapshot that indicates one or more first changes to the intent policy model from the initial time to the start time associated with the portion, and one or more additional delta snapshots that respectively indicate one or more incremental changes to the intent policy model at times from the start time and to the end time associated with the portion of the data structure.

Process 600 may include additional implementations, such as any single implementation or any combination of implementations described below and/or in connection with one or more other processes described elsewhere herein.

In a first implementation, process 600 includes receiving, after updating the data structure, a message indicating that the system is to deploy an updated version of the intent policy model at a deployment time to a device, identifying, based on the message, a previous deployment time at which the system deployed a previous version of the intent policy model to the device, and generating, based on the data structure, the previous deployment time, and the deployment time, a differential deployment snapshot.

In a second implementation, alone or in combination with the first implementation, to generating the differential deployment snapshot includes identifying a first portion of the data structure associated with the previous deployment time, identifying a second portion of the data structure associated with the deployment time, and generating, based on at least one of the one or more additional delta snapshots included in the first portion of the data structure and at least one of the one or more additional delta snapshots included in the second portion of the data structure, the differential deployment snapshot.

In a third implementation, alone or in combination with one or more of the first and second implementations, process 600 includes generating, based on the differential deployment snapshot, device-level provisioning configuration information for the device, and providing the device-level provisioning configuration information to the device, wherein providing the device-level provisioning configuration information permits the updated version of the intent policy model to be deployed on the device.

In a fourth implementation, alone or in combination with one or more of the first through third implementations, process 600 includes receiving, after updating the data structure, a message indicating that the system is to deploy a previous version of the intent policy model to a device, identifying, based on the message, a previous deployment time at which the system deployed the previous version of the intent policy model to the device, and generating, based on the data structure and the previous deployment time, a rollback deployment snapshot.

In a fifth implementation, alone or in combination with one or more of the first through fourth implementations, generating the rollback deployment snapshot includes identifying a particular portion of the data structure associated with the previous deployment time, and generating, based on the first delta snapshot included in the particular portion of the data structure, the rollback deployment snapshot.

In a sixth implementation, alone or in combination with one or more of the first through fifth implementations, process 600 includes generating, based on the rollback deployment snapshot, device-level rollback configuration information for the device, and providing the device-level rollback configuration information to the device, wherein providing the device-level rollback configuration information permits the previous version of the intent policy model to be deployed on the device.

In a seventh implementation, alone or in combination with one or more of the first through sixth implementations, process 600 includes identifying a first portion of the data structure associated with a previous deployment time at which the system deployed a previous version of the intent policy model to a device, identifying a second portion of the data structure associated with a deployment time at which the system is to deploy an updated version of the intent policy model to the device, and generating, based on at least one of the one or more additional delta snapshots included in the first portion of the data structure and at least one of the one or more additional delta snapshots included in the second portion of the data structure, a differential deployment snapshot.

In an eighth implementation, alone or in combination with one or more of the first through seventh implementations, process 600 includes identifying a portion of the data structure associated with a previous deployment time at which the system deployed a previous version of the intent policy model to a device, and generating, based on the first delta snapshot included in the portion of the data structure, a rollback deployment snapshot.

In a ninth implementation, alone or in combination with one or more of the first through eighth implementations, process 600 includes generating, based on at least one portion of the data structure, a deployment snapshot, generating, based on the deployment snapshot, device-level configuration information for a device, and providing the device-level configuration information to the device.

Although FIG. 6 shows example blocks of process 600, in some implementations, process 600 includes additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, satisfying a threshold may, depending on the context, refer to a value being greater than the threshold, greater than or equal to the threshold, less than the threshold, less than or equal to the threshold, equal to the threshold, not equal to the threshold, or the like.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   generating, by a system, an initial delta snapshot that indicates one or more first changes to an intent policy model from an initial time to a first time;
   storing, by the system, the initial delta snapshot in a first portion of a data structure;
   generating, by the system and after storing the initial delta snapshot, a first delta snapshot that indicates one or more second changes to the intent policy model from the first time to a second time;
   storing, by the system, the first delta snapshot in the first portion of the data structure;
   generating, by the system and after storing the first delta snapshot, a second delta snapshot that indicates one or more third changes to the intent policy model from the second time to a third time;
   storing, by the system, the second delta snapshot in the first portion of the data structure;
   determining, by the system and after storing the second delta snapshot, that additional delta snapshots are not to be stored in the first portion of the data structure;
   generating, by the system, based on determining that additional delta snapshots are not be stored in the first portion of the data structure, and based on the initial delta snapshot, the first delta snapshot, and the second delta snapshot, an accumulated delta snapshot that indicates the one or more first changes, the one or more second changes, and the one or more third changes to the intent policy model from the initial time to the third time;
   storing, by the system, the accumulated delta snapshot in a second portion of the data structure;
   identifying, based on a message indicating that the system is to deploy an updated version of the intent policy model at a deployment time to a device, a previous deployment time at which the system deployed a previous version of the intent policy model to the device; and
   generating, based on the data structure, the previous deployment time, and the deployment time, a differential deployment snapshot.

2. The method of claim 1, further comprising:
generating, after storing the accumulated delta snapshot, a third delta snapshot that indicates one or more fourth changes to the intent policy model from the third time to a fourth time; and
storing the third delta snapshot in the second portion of the data structure.

3. The method of claim 1, wherein determining that additional delta snapshots are not to be stored in the first portion of the data structure comprises at least one of:
determining that a total amount of time since the first time is greater than or equal to a time duration threshold;
determining that a total number of delta snapshots stored in the first portion of the data structure is greater than or equal to a delta snapshot number threshold; or
determining that a total number of resources identified by the delta snapshots stored in the first portion of the data structure is greater than or equal to a resource number threshold.

4. The method of claim 1, further comprising:
receiving, after storing the accumulated delta snapshot, the message indicating that the system is to deploy the version of the intent policy model at the deployment time to the device.

5. The method of claim 1, wherein generating the differential deployment snapshot comprises:
identifying a portion of the data structure associated with the previous deployment time;
identifying another portion of the data structure associated with the deployment time; and
generating, based on at least one delta snapshot included in the portion of the data structure and at least one delta snapshot included in the other portion of the data structure, the differential deployment snapshot.

6. The method of claim 1, further comprising:
generating, based on the differential deployment snapshot, device-level provisioning configuration information for the device; and
providing the device-level provisioning configuration information to the device,
wherein providing the device-level provisioning configuration information permits the updated version of the intent policy model to be deployed on the device.

7. The method of claim 1, further comprising:
receiving, after storing the accumulated delta snapshot, a message indicating that the system is to deploy a previous version of the intent policy model to the device;
identifying, based on the message, a previous deployment time at which the system deployed the previous version of the intent policy model to the device; and
generating, based on the data structure and the previous deployment time, a rollback deployment snapshot.

8. The method of claim 7, wherein generating the rollback deployment snapshot comprises:
identifying a portion of the data structure associated with the previous deployment time; and
generating, based on the accumulated delta snapshot included in the portion of the data structure, the rollback deployment snapshot.

9. The method of claim 7, further comprising:
generating, based on the rollback deployment snapshot, device-level rollback configuration information for the device; and
providing the device-level rollback configuration information to the device,
wherein providing the device-level rollback configuration information permits the previous version of the intent policy model to be deployed on the device.

10. A non-transitory computer-readable medium storing a set of instructions, the set of instructions comprising:
one or more instructions that, when executed by one or more processors of a system, cause the system to:
identify an intent policy model associated with an initial time;
update a data structure to cause the data structure to include one or more portions,
wherein each portion of the data structure is associated with a start time and an end time, and each portion includes:
a first delta snapshot that indicates one or more first changes to the intent policy model from the initial time to the start time associated with the portion; and
one or more additional delta snapshots that respectively indicate one or more incremental changes to the intent policy model at times from the start time and to the end time associated with the portion of the data structure;
identify, based on a message indicating that the system is to deploy a previous version of the intent policy model to a device, a previous deployment time at which the system deployed the previous version of the intent policy model to the device; and
generate, based on the data structure and the previous deployment time, a rollback deployment snapshot.

11. The non-transitory computer-readable medium of claim 10, wherein the one or more instructions further cause the system to:
receive, after updating the data structure, a message indicating that the system is to deploy an updated version of the intent policy model at a deployment time to the device;
identify, based on the message, a previous deployment time at which the system deployed a previous version of the intent policy model to the device; and
generate, based on the data structure, the previous deployment time, and the deployment time, a differential deployment snapshot.

12. The non-transitory computer-readable medium of claim 11, wherein the one or more instructions, that cause the system to generate the differential deployment snapshot, cause the system to:
identify a first portion of the data structure associated with the previous deployment time;
identify a second portion of the data structure associated with the deployment time; and
generate, based on at least one of the one or more additional delta snapshots included in the first portion of the data structure and at least one of the one or more additional delta snapshots included in the second portion of the data structure, the differential deployment snapshot.

13. The non-transitory computer-readable medium of claim 11, wherein the one or more instructions further cause the system to:
generate, based on the differential deployment snapshot, device-level provisioning configuration information for the device; and
provide the device-level provisioning configuration information to the device, wherein providing the device-level provisioning configuration information permits the updated version of the intent policy model to be deployed on the device.

14. The non-transitory computer-readable medium of claim 10, wherein the one or more instructions further cause the system to:
receive, after updating the data structure, the message indicating that the system is to deploy the previous version of the intent policy model to the device.

15. The non-transitory computer-readable medium of claim 10, wherein the one or more instructions, that cause the system to generate the rollback deployment snapshot, cause the system to:
identify a particular portion of the data structure associated with the previous deployment time; and
generate, based on the first delta snapshot included in the particular portion of the data structure, the rollback deployment snapshot.

16. The non-transitory computer-readable medium of claim 10, wherein the one or more instructions further cause the system to:
generate, based on the rollback deployment snapshot, device-level rollback configuration information for the device; and
provide the device-level rollback configuration information to the device,
wherein providing the device-level rollback configuration information permits the previous version of the intent policy model to be deployed on the device.

17. A system, comprising:
one or more memories; and
one or more processors to:
update a data structure to cause the data structure to include a plurality of portions,
wherein each portion of the data structure includes:
a first delta snapshot that indicates one or more first changes to an intent policy model from an initial time to a start time associated with the portion; and
one or more additional delta snapshots that respectively indicate one or more incremental changes to the intent policy model at times from the start time and to an end time associated with the portion of the data structure;
generate, based on at least one portion of the data structure, a deployment snapshot;
generate, based on the deployment snapshot, device-level configuration information for a device; and
provide the device-level configuration information to the device.

18. The system of claim 17, wherein the one or more processors are further to:
identify a first portion of the data structure associated with a previous deployment time at which the system deployed a previous version of the intent policy model to a device;
identify a second portion of the data structure associated with a deployment time at which the system is to deploy an updated version of the intent policy model to the device; and
generate, based on at least one of the one or more additional delta snapshots included in the first portion of the data structure and at least one of the one or more additional delta snapshots included in the second portion of the data structure, a differential deployment snapshot.

19. The system of claim 17, wherein the one or more processors are further to:
identify a portion of the data structure associated with a previous deployment time at which the system deployed a previous version of the intent policy model to a device; and
generate, based on the first delta snapshot included in the portion of the data structure, a rollback deployment snapshot.

20. The system of claim 17, wherein providing the device-level configuration information causes an updated version of the intent policy model to be deployed on the device.

* * * * *